(12) United States Patent
Scheiblecker et al.

(10) Patent No.: US 9,592,819 B2
(45) Date of Patent: Mar. 14, 2017

(54) TRANSMISSION EMERGENCY RELEASE

(71) Applicant: AUDI AG, Ingolstadt (DE)

(72) Inventors: Georg Scheiblecker, Kipfenberg-Böhming (DE); Bodo Wilke, Hitzhofen (DE); Arya Bhattacharya, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 208 days.

(21) Appl. No.: 14/361,582

(22) PCT Filed: Nov. 24, 2012

(86) PCT No.: PCT/EP2012/004870
§ 371 (c)(1),
(2) Date: May 29, 2014

(87) PCT Pub. No.: WO2013/079182
PCT Pub. Date: Jun. 6, 2013

(65) Prior Publication Data
US 2014/0318297 A1    Oct. 30, 2014

(30) Foreign Application Priority Data

Nov. 30, 2011  (DE) .......................... 10 2011 119 747

(51) Int. Cl.
*B60W 10/18* (2012.01)
*F16H 63/34* (2006.01)
(Continued)

(52) U.S. Cl.
CPC .......... *B60W 10/182* (2013.01); *B60W 10/11* (2013.01); *F16H 63/3491* (2013.01); *F16H 59/10* (2013.01); *Y10T 74/20098* (2015.01)

(58) Field of Classification Search
CPC .... B60T 7/045; B60T 2201/10; B60T 17/086; B60W 10/10; B60W 10/11;
(Continued)

(56) References Cited

U.S. PATENT DOCUMENTS 4,223,768 A * 9/1980 Iwanaga ................. B60T 1/005
  188/69
5,187,999 A * 2/1993 Kobayashi ............. F16H 59/10
  192/220.2
(Continued)

FOREIGN PATENT DOCUMENTS

| CN | 102313009 A | 1/2012 |
| CN | 202215728 U | 5/2012 |

(Continued)

OTHER PUBLICATIONS

Chinese Search Report issued by the Chinese Patent Office in Chinese Application No. 2012800591246 on May 6, 2015.
(Continued)

*Primary Examiner* — David M Fenstermacher
*Assistant Examiner* — Leonard J Archuleta
(74) *Attorney, Agent, or Firm* — Henry M. Feiereisen LLC.

(57) ABSTRACT

A transmission emergency release for an automatic transmission which is mechanically blocked when a parking mode is engaged, includes a manually operable actuating element for the mechanical deactivation of the parking mode, wherein the actuating element has a vehicle-fixed mount (1, 29) with a force transmitting element and an actuating lever (9, 25) which is insertable in the vehicle-fixed mount (1, 29) to disable the parking mode in order to disable the parking mode by means of the force-transmitting element.

17 Claims, 6 Drawing Sheets

(51) Int. Cl.
*B60W 10/11* (2012.01)
*F16H 59/10* (2006.01)

(58) Field of Classification Search
CPC .......... B60W 10/18; B60W 10/182; F16H
2059/0282; F16H 2061/223; F16H
2061/226; F16H 59/10; F16H 63/3491;
F16H 63/36; Y10T 16/54024; Y10T
16/5407; Y10T 70/7045; Y10T 70/8946;
Y10T 70/5925; Y10T 74/20104; Y10T
74/2042; Y10T 74/20402; Y10T
74/20098; Y10T 74/2069
USPC ........ 74/473.3, 473.21, 473.23, 473.24, 529;
188/265; 192/218, 219.4, 219.5, 219.6,
192/220.2
See application file for complete search history.

(56) References Cited

U.S. PATENT DOCUMENTS

| | | | | |
|---|---|---|---|---|
| 6,179,108 B1* | 1/2001 | Gierer | ............ | F16H 63/48 192/218 |
| 6,619,459 B2* | 9/2003 | Gudlin | ............ | B60T 7/107 188/156 |
| 6,631,654 B2* | 10/2003 | Ehrmaier | ............ | F16H 59/08 192/219.6 |
| 6,701,797 B2* | 3/2004 | Heuver | ............ | B60T 1/005 192/219.5 |
| 6,779,645 B2* | 8/2004 | Nagasaka | ............ | F16H 63/48 192/219.4 |
| 6,851,538 B2 | 2/2005 | Meyer et al. | | |
| 7,743,901 B2* | 6/2010 | Hayashi | ............ | B60T 7/104 192/219.6 |
| 2003/0173181 A1* | 9/2003 | Meyer | ............ | F16H 59/10 192/219 |
| 2009/0151501 A1* | 6/2009 | Jung | ............ | F16C 1/12 74/502 |
| 2010/0288598 A1* | 11/2010 | Giefer | ............ | F16H 63/3491 192/219.6 |
| 2011/0030494 A1* | 2/2011 | Ruhl | ............ | F16H 63/3491 74/473.23 |
| 2011/0240437 A1* | 10/2011 | Saitner | ............ | F16H 63/3491 192/219.4 |
| 2012/0298473 A1* | 11/2012 | Merklein | ............ | F16H 63/3491 192/219.6 |
| 2014/0182408 A1* | 7/2014 | Galden | ............ | F16H 61/22 74/473.21 |
| 2014/0311269 A1* | 10/2014 | Fournier | ............ | F16H 59/0278 74/473.3 |

FOREIGN PATENT DOCUMENTS

| | | |
|---|---|---|
| DE | 196 53 961 | 6/1998 |
| DE | 199 40 029 | 3/2001 |
| DE | 100 45 953 | 5/2002 |
| DE | 101 40 164 | 3/2003 |
| DE | 102007011359 A1 | 9/2008 |
| DE | 102007011614 | 9/2008 |
| DE | 102009028340 | 2/2011 |
| DE | 102010003508 A1 | 10/2011 |

OTHER PUBLICATIONS

English translation of Chinese Search Report issued by the Chinese Patent Office in Chinese Application No. 2012800591246 on May 6, 2015.
International Search Report issued by the European Patent Office in International Application PCT/EP2012/004870 on Feb. 28, 2013.

* cited by examiner

TRANSMISSION EMERGENCY RELEASE

CROSS-REFERENCES TO RELATED APPLICATIONS

This application is the U.S. National Stage of International Application No. PCT/EP2012/004870, filed Nov. 24, 2012, which designated the United States and has been published as International Publication No. WO 2013/079182 A1 and which claims the priority of German Patent Application, Serial No. 10 2011 119 747.1, filed Nov. 30, 2011, pursuant to 35 U.S.C. 119(a)-(d).

BACKGROUND OF THE INVENTION

The invention relates to a transmission emergency release for an automatic transmission which is mechanically blocked when a parking mode is engaged, and includes a manually operable actuating element for mechanical disabling the parking mode.

Automatic transmissions for motor vehicles having an operating range which is divided into various manually selectable operating modes, which are referred to as drive positions. The drive positions include also the parking mode (parking position) and the neutral position. Drive positions of an automatic transmission are selected by the driver on a control unit, resulting in electro-hydraulic actuators to be engaged in the automatic transmission. When the parking mode is engaged, the automatic transmission is mechanically blocked so that the vehicle cannot be towed in the event of a power failure or a fault in the associated electronic control. In order to release this lock, a mechanical emergency release has to be actuated. The same problem exists also in newer automatic transmissions in which control inputs by the driver are transmitted via a shift-by-wire control element electronically to the automatic transmission.

DE 10 2007 011 614 A1 describes a transmission emergency release which is coupled to the gear selector. This apparatus is also suitable for shift-by-wire systems. The transmission emergency release can be activated by a coupling member which can be formed for example as a lever.

DE 199 40 029 A1 discloses a drive position selecting device with an emergency operation for a parking lock, which includes a Bowden cable that is connected to a lever. To trigger the emergency operation, a tensile force is applied upon the Bowden cable so that the lever is pivoted and the automatic transmission is released.

DE 101 40 164 A1 discloses a transmission emergency release in which unlocking is implemented by the transmission selector lever. A release mechanism is secured by a lock, the release mechanism is liberated after unlocking the lock so that the transmission selector can be pivoted beyond a movement limitation, resulting in a release of the parking mode mechanically via a Bowden cable.

Implementing a transmission emergency release requires solution of a number of problems: The cable pull has to be operated by a force that cannot be manually applied, therefore a force multiplication has to be integrated into the emergency release. In order to prevent uncontrolled rolling of the vehicle when operating the emergency release, the foot brake has to be applied at the same time. Thus, the emergency release has to be positioned within reach of the driver. To limit the length of the cable pull, the emergency release must be positioned in the vicinity of the transmission. As a result, only a few locations exist in the vehicle to accommodate the transmission emergency release. When the transmission is located in the front, the emergency release is suitably accommodated in the driver-side footwell. When the transmission is located in the rear, the emergency release is suitably accommodated in the center console or next to the driver seat or in the rear-window shelf when a two-seater is involved.

Conventional transmission emergency releases require large installation space and can be easily installed only in larger vehicles. When small cars or sports cars are involved, this is not possible due to the requirements of body shell, chassis and ergonomics.

SUMMARY OF THE INVENTION

The invention is therefore based on the object to provide a transmission emergency release having reduced need for installation space.

This object is achieved according to the invention by a transmission emergency release of the aforementioned type by providing the actuating element with a vehicle-fixed mount with a force-transmitting element and an actuating lever which is insertable in the vehicle-fixed mount to deactivate the parking mode in order to disable the parking mode by means of the force-transmitting element.

The invention is based on the recognition that a major part of the required installation space can be saved in critical areas by configuring the actuating element in two parts with a vehicle-fixed mount and an actuating lever which is separate from the mount and is inserted in the vehicle-fixed mount only in case of need, i.e. when executing an emergency release of the transmission. During normal operation, the actuating lever can be stowed at a different location in the vehicle. The space-intensive mechanism in the form of the actuating lever projects into the passenger compartment only for a limited time period during an emergency release of the transmission and is otherwise part of the on-board tool kit. Thus, additional storage space in the center console is provided, for example.

It is expected that automatic transmissions with shift-by-wire operation increasingly come into use in the future, particularly in the context of the increasing use of hybrid vehicles. It can also be assumed that the number of control devices continues to increase in the future so that problems to find installation space may arise. The transmission emergency release according to the invention can therefore be used advantageously also in small cars or sports cars, as it requires only very little installation space.

In the transmission emergency release according to the invention, it is particularly preferred that the actuating lever can be coupled with the vehicle-fixed mount in a formfitting manner. In the coupled state, the force needed for the release can be applied and transmitted to the force transmitting element.

A particularly space-saving attachment is realized, when the vehicle-fixed mount of the transmission emergency release according to the invention has a plate in which a matingly shaped portion of the actuating lever can be inserted. This plate requires only little space so that the interior of the vehicle is not adversely affected unnecessarily.

According to a refinement of the transmission emergency release according to the invention, the actuating lever can be provided with a locking element which is insertable into a vehicle-fixed opening. This opening may be formed in particular as a groove or hole. The locking member provides a firm linkage of the actuating element with the vehicle-fixed mount so that the parking mode can be disabled in this state.

A particularly reliable operation is obtained when the transmission emergency release according to the invention has a tie rod which is arranged in the mount and connected to a cable pull and which can be coupled in the mount with the actuating lever by a form fit and/or interference fit, when inserting the actuating lever. The coupling is preferably established automatically when inserting the actuating lever.

According to a refinement of the invention, the actuating lever can include a hand crank, and preferably a force multiplication to reduce the actuating force that has to be applied manually. In this way, an emergency release can be executed with little effort by a user.

As an alternative, the actuating lever of the transmission emergency release according to the invention can have a carriage which can be coupled with the vehicle-fixed mount by a form fit and can be coupled with a lever handle to disable the parking mode by a tie rod which is arranged in the mount and connected to a cable pull.

It is also within the scope of the invention that the actuating lever has an external thread and/or a pin so that the actuating lever is guided by an internal thread and/or a guideway of the housing. Preferably, the thread is configured such that no self-locking occurs. The carriage coupled to the actuating lever is non-rotatably supported on the housing and axially movable. It is rotatably mounted to the actuating lever and is moved along as the actuating handle is axially moved. When being rotated, the actuating lever moves via the thread and/or guideway axially upwards and pulls the carriage with the tie rod with it so that the parking mode is disabled via the force transmitting element. According to a refinement of the invention, the actuating lever can be locked in an end position when the actuating element is actuated (activated). The guideway of the housing is formed such that the pin of the actuating lever is locked in the end position. Thus, the user receives a feedback so as to be able to recognize when the parking mode is disabled and the transmission is released.

According to a refinement, the transmission emergency release can be transferred back to its original position when the user applies a force with the assistance of a return spring.

Preferably, the locking mechanism of the transmission emergency release is provided with a peg or ejector which presses the pin from the end position, when the locking mechanism is pushed up. As a result, the locked position is released again, the carriage is moved downwards and the deactivation of the parking mode is reversed again, when the actuating element is removed.

Besides the described manually operable variants of the transmission emergency release according to the invention, the provision of an electrified variant is possible. The latter includes an integrated electric motor which is supplied with energy by an accumulator. Instead of an actuating lever, a push button is provided on the actuating element to replace an actuating handle or an actuating lever. The lower region of the actuating element, which includes a housing, a guide sleeve and an outer thread and/or a pin, remains the same however. This electric variant is inserted and locked in the vehicle-fixed mount like the manually operable variant. Actuation of the push button causes the electric motor to move a structure by which the carriage is pulled up so that the parking mode is disabled, The accumulator supplies the energy necessary for the actuation, when the on-board electrical system has failed. A powerful accumulator such as a lithium-ion battery that provides functional life for many years is especially appropriate.

Primarily, the transmission emergency release is provided for such cases, when the entire on-board electrical system has failed. In the event, a malfunction causes only part of the on-board electrical system to fail or the automatic transmission is locked for another reason, the provision of a connection of the transmission emergency release according to the invention to the on-board electrical system is conceivable as power source in addition to the integrated accumulator. For this purpose, the transmission emergency release has a respective electrical connection, for example a contact point. The actuating element has a corresponding mating contact point and a wiring for the power supply to the electric motor. In these cases, the integrated accumulator provides only an "emergency solution".

For larger vehicles, for example trucks, the passenger compartment and the automatic transmission are located far apart, the cable pull is therefore very long and cumbersome accordingly. To avoid this disadvantage, an electrical decoupling can be provided between the transmission emergency release and the automatic transmission. The mechanism for the electric emergency release may be located outside the driver's cab in the vicinity of the automatic transmission. Inside the cab, there is a remote control which is connected to the on-board electrical system and/or an independent power source (accumulator). For actuating the transmission emergency release according to the invention, the driver is able to operate the remote control from the passenger compartment. The remote control sends a signal to the emergency release so that the integrated electric motor pulls the force transmitting element, in particular a cable pull, to thereby disable the parking mode.

In addition to the remote control, the emergency release requires a transmitter and a receiver for receiving the signal from the remote control and to send back a corresponding signal after the release of the automatic transmission. In this way, the driver obtains feedback via an indicator light after the parking mode of the automatic transmission has been disabled.

In addition, the invention relates to a motor vehicle. The vehicle according to the invention has a transmission emergency release of the described type.

BRIEF DESCRIPTION OF THE DRAWING

Further advantages and details of the invention are explained based on exemplary embodiments with reference to the drawings. The drawings are schematic illustrations and show.

DETAILED DESCRIPTION OF PREFERRED EMBODIMENTS

Figure 1:
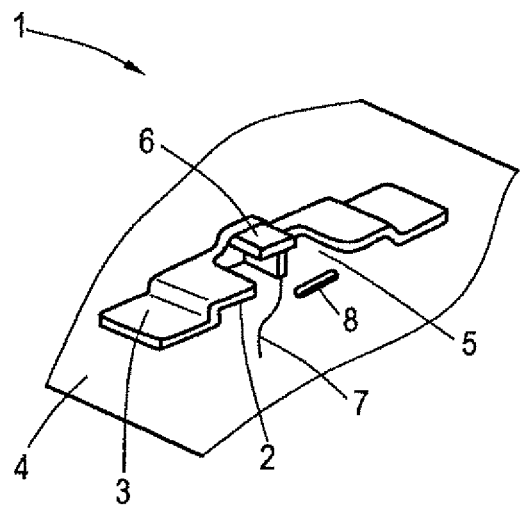
FIG. 1 a perspective view of a vehicle-fixed mount of a first exemplary embodiment of a transmission emergency release according to the invention.

FIG. 1 is a perspective view of a vehicle-fixed mount 1 as component of an actuating element of a transmission emergency release for an automatic transmission of a motor vehicle. The vehicle-fixed mount includes a plate 2 which is angled in relation to a fastening portion 3. The fastening portion 3 is securely connected to a vehicle body 4, in the illustrated embodiment, it is welded. A clearance is formed between the vehicle body 4 and the fastening portion 3 for insertion of an actuating element. The vehicle-fixed mount 1 is symmetrical in configuration and has in midsection a one-sided opening 5 into which an actuating element can be inserted. The one-sided opening 5 is configured as a rectangular recess of the plate 2.

In FIG. 1 a tie rod 6 of T-shaped configuration is located in the opening 5 and connected at its lower end to a cable pull 7. The cable pull 7 is part of a Bowden cable whose other end is attached to an automatic transmission so that the parking mode of the automatic transmission can be disabled by a pulling force acting on the tie rod 6.

Provided next to the opening 5 of the plate 2 is a vehicle-fixed opening which is configured as a groove 8. An actuating element formed as an actuating lever can be inserted and locked in the groove 8.

Figure 2:
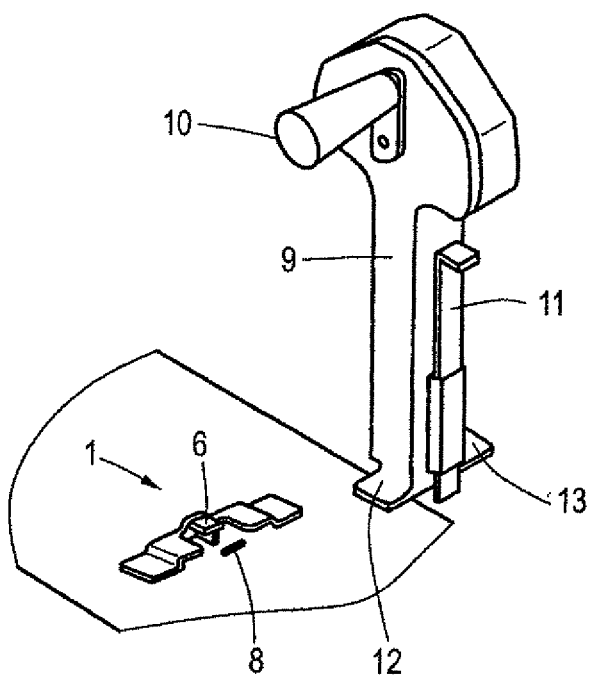
FIG. 2 the vehicle-fixed mount shown in FIG. 1 and an actuating lever having a hand crank.

FIG. 2 shows the vehicle-fixed mount 1 and an actuating lever 9. The actuating lever 9 includes a crank 10 to exert a pulling force upon the tie rod 6 in the coupled state. The actuating lever 9 has front and rear base portions 12, 13 of a shape and size suited to the plate 2. The base portions 12, 13 can be pushed laterally into the clearance between the plate 2 and the vehicle body 4 until the actuating lever 9 is located in the opening 5. Thereafter, a latch 11 can be pressed into the groove 8 to formfittingly couple the actuating lever 9 to the vehicle-fixed mount 1. During insertion or engagement, the tie rod 6 is received at the same time in form-fitting manner in a carriage inside the actuating lever 9.

Figure 4:
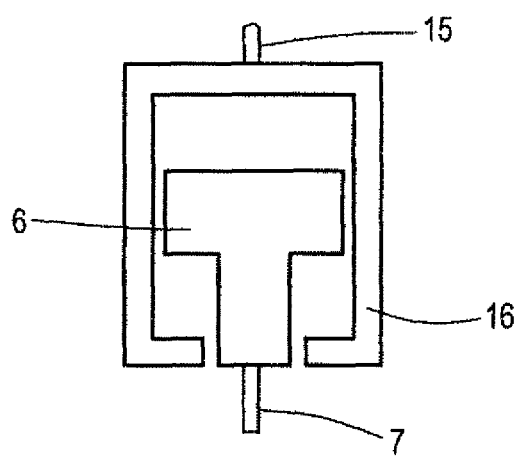
FIG. 4 a detail of the actuating lever, showing its base being inserted into the mount.

The crank 10 is connected via a multiplier 14 with a cable pull 15 having a carriage 16 at its lower end. During engagement, the tie rod 6 is formfittingly received in the carriage 16, as shown in FIG. 4.

Figure 3:
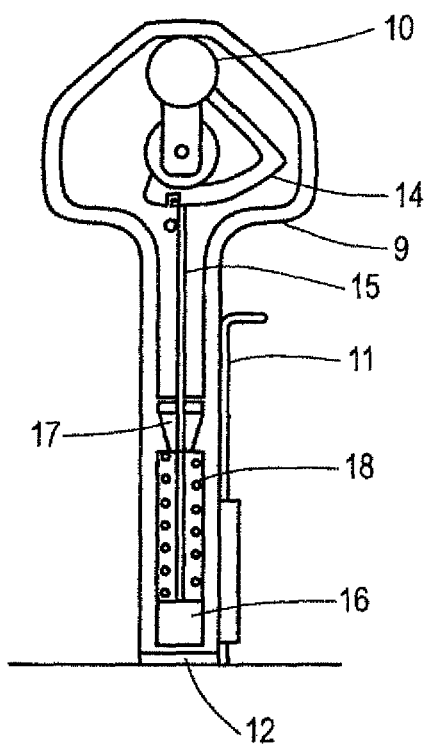
FIG. 3 the actuating lever after insertion into the mount.

As the crank 10 is turned, the cable pull 15 is pulled up together with the attached carriage 16 via the multiplier 14 so as to apply a pulling force on the tie rod 6 and the cable pull 7 connected therewith. In order to prevent the carriage 16 from recoiling, when the crank 10 is released, the actuating lever 9 has a wedge brake 17. In order for the carriage 16 to assume the initial position shown in FIG. 3 prior to carrying out a transmission emergency release, a return spring 18 is mounted above the carriage 16 for pushing the carriage 16 downwards. Turning the crank 10 overcomes the force of the spring 18 and the carriage 16 is pulled upwards.

In other exemplary embodiments, the crank 10 has a locking bolt to lock the crank 10 in the end position, after deactivation of the parking mode.

Figure 5:
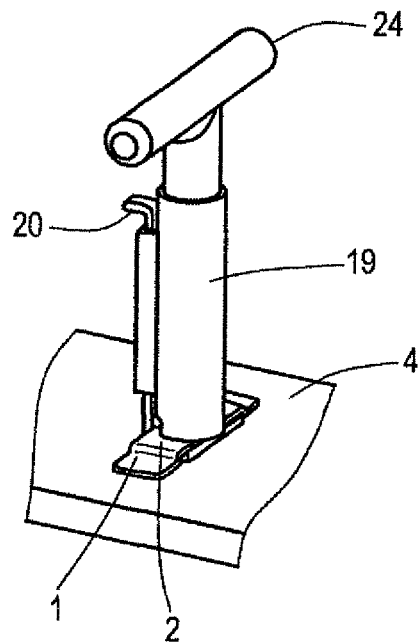
FIG. 5 a second exemplary embodiment of a transmission emergency release according to the invention with an actuating element having a carriage.
Figure 6:
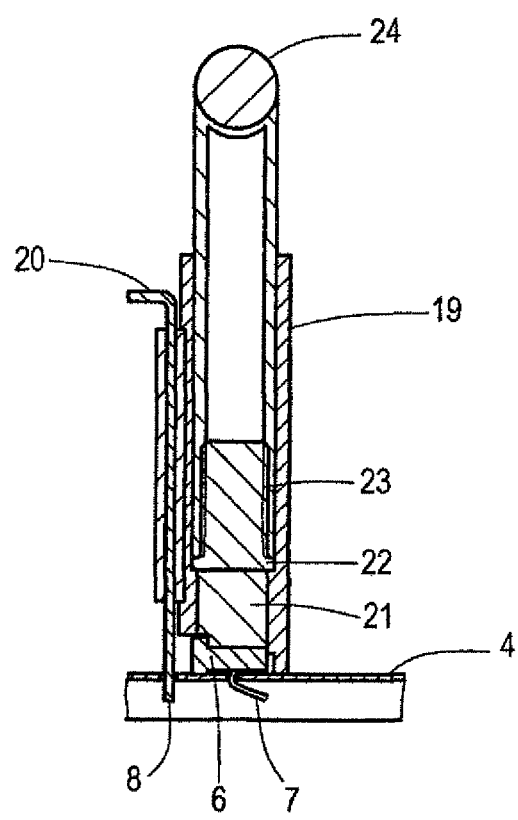
FIG. 6 a sectional view of the actuating element shown in FIG. 5.

FIGS. 5 and 6 show a second exemplary embodiment of the essential components of a transmission emergency release. The vehicle-fixed mount 1 secured to the vehicle body 4 essentially corresponds to the one of the first exemplary embodiment.

The actuating element includes a tubular housing 19 which can be engaged in the plate 2. A latch 20 is located on a side of the housing 19 and can be pressed downwards after engagement into the groove 8 in order to formfittingly connect the actuating element to the vehicle-fixed mount 1.

Inside the housing 19 is a carriage 21 which is non-rotatably received in the housing 19. Extensions or projections 22 are provided on the outer side of the carriage 21 to prevent rotation of the carriage 21 relative to the housing 19. An upper portion of the carriage 21 has an outer thread 23. The tie rod 6 is received in the lower portion of the carriage 21 and has an underside where the cable pull 7 is located.

The actuating element further includes a hollow handle 24 with an internal thread which is threadably engaged onto the external thread 23 of the carriage 21.

When rotating the handle 24, the connection of the internal thread in the handle 24 with the external thread 23 of the carriage 21 causes an upward movement of the non-rotatably mounted carriage 21 with the tie rod 6 formfittingly received therein.

Due to the force transmission via the self-locking threads, the necessary forces can be translated on one hand, and, on the other hand, an undesirable recoiling of the carriage 21 is precluded in the direction of the body 4. The exemplary embodiment shown in FIGS. 5 and 6 is characterized by a small number of components.

The actuating element, comprised essentially of the housing 19 and the handle 24, is inserted in the vehicle-fixed mount 1 only for execution of a transmission emergency release, otherwise, it is stowed at a different location in the vehicle, for example in the on-board tool kit.

Figure 7:
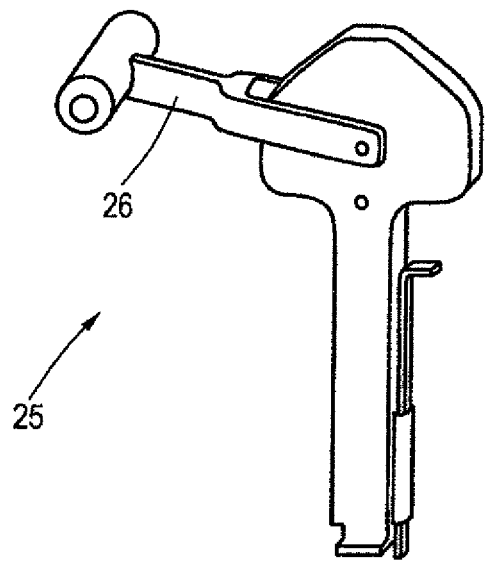
FIG. 7 an actuating lever with greater leverage.

FIG. 7 shows an embodiment of a differently structured actuating lever. Basically the actuating lever 25 shown in FIG. 7 corresponds to the actuating lever 9 of the first exemplary embodiment. The actuating lever 25 includes, however, a handle 26 having a longer lever arm so that in addition to the multiplication, the operating forces are reduced.

Figure 8:
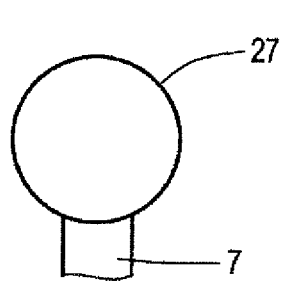
FIG. 8 a tie rod.
Figure 9:
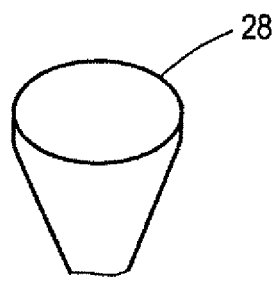
FIG. 9 a further exemplary embodiment of a tie rod.

FIGS. 8 and 9 illustrate alternative embodiments of a tie rod. FIG. 8 shows a tie rod 27 having a ball head which can be received by a correspondingly shaped carriage. As a further alternative, FIG. 9 shows a pear-shaped tie rod 28, which can also be received and pulled by a correspondingly shaped carriage. In the tie rods shown in FIGS. 8 and 9, a form-fit connection is present but also other embodiments are conceivable in which the tie rod is received in the carriage by interference fit.

Figure 10:
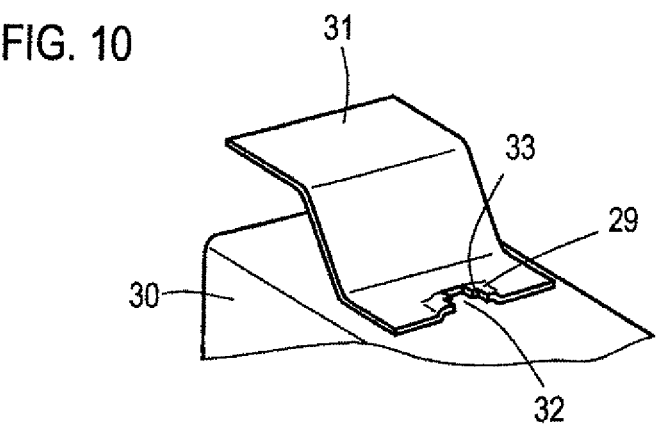
FIG. 10 a further exemplary embodiment of a vehicle-fixed mount.

FIG. 10 finally shows an alternative exemplary embodiment of a vehicle-fixed mount 29. The vehicle-fixed mount 29 is attached in the area of a tunnel 30 of a vehicle body and integrated into an anyway existing body component 31. In the region of attachment of the body component 31 to the tunnel 30, the vehicle-fixed mount 29 has—analogous to the mount 1 shown in FIG. 1—an opening 32 and an angled plate 33, thereby forming a clearance in which an actuating element is engageable. By integrating the vehicle-fixed mount into an existing body component 31, the transmission emergency release can be realized especially easily and with little effort.

Figure 11:
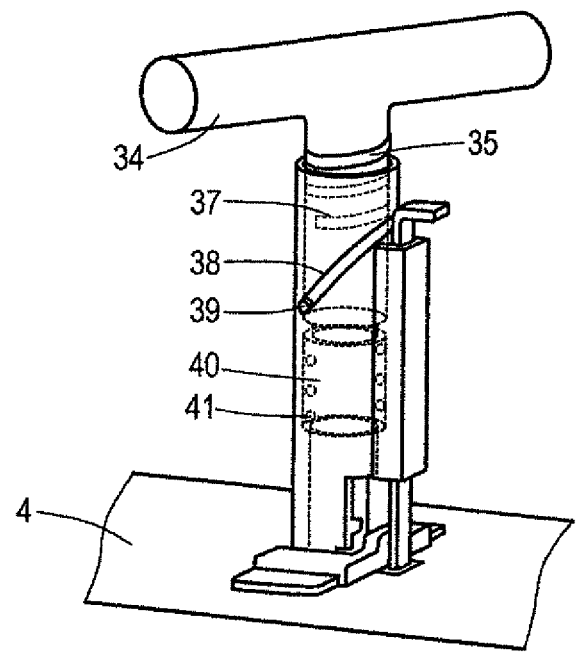
FIG. 11 a further exemplary embodiment of a transmission emergency release according to the invention.

FIG. 11 shows an exemplary embodiment of a transmission emergency release, with an actuating lever 34 having an external thread 35 which interacts with an internal thread of a housing 36. The external thread 35 and the internal thread 37 are configured such that no self-locking occurs.

The housing 36 includes a guideway 38, which extends helically and into which a pin 39 of the actuating lever 34 is guided. A carriage 40 is rotatably mounted on the actuating lever 34, the carriage 40 is restrained against rotation relative to the housing 36 and axially displaceable. When being rotated by a user, the actuating lever 34 is moved by means of the meshing threads 35, 37 and the pin running in the guideway 38 axially away from the vehicle body 4 (upwards). A tie rod, which is mounted on the lower end of the carriage 40, is pulled upwards to thereby disable the parking mode.

Arranged between the housing 36 and the carriage 40 is a spring element 41 which generates a recoiling force when the actuating lever 34 is released to thereby move the actuating lever 34 back into the starting position.

Figure 12:
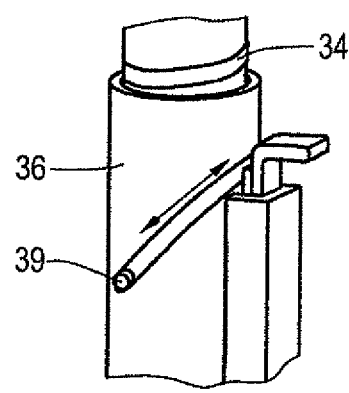
FIG. 12 an enlarged view of the guideway.

FIG. 12 shows the area of the guideway 38 of the housing 36 on an enlarged scale. In FIG. 12, the pin 39 is in its initial position, i.e. in the non-actuated state in which the parking mode is activated. Upon unlocking by a user, the pin 39 is moved by the rotation of the actuating lever 34 along the guideway 38, as indicated by the double arrow.

Figure 13:
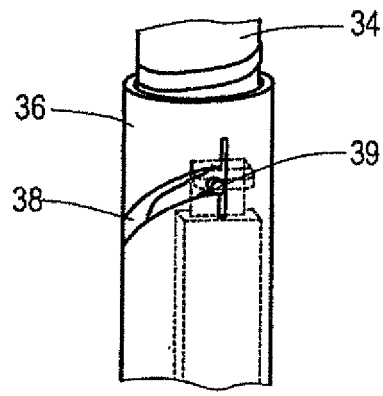
FIG. 13 the transmission emergency release in the end position.
Figure 14:
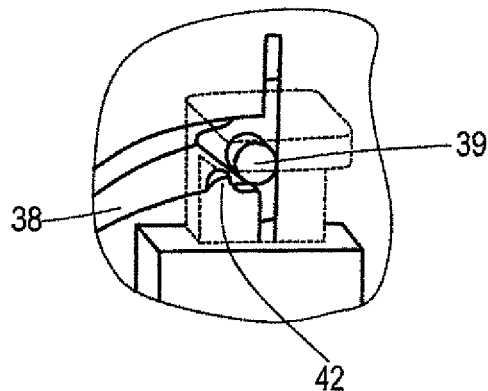
FIG. 14 the locking in the end position of FIG. 13 by way of an enlarged view.

FIG. 13 shows, together with FIG. 14, the end position after the pin 39 has reached the upper end of the guideway 38. At the upper end of the guideway 38, the latter has a projecting detent portion 42 behind which the pin 39 locks into place. This engagement is perceived by the user who can then recognize that the actuating lever 34 is in the locked position.

Figure 15:
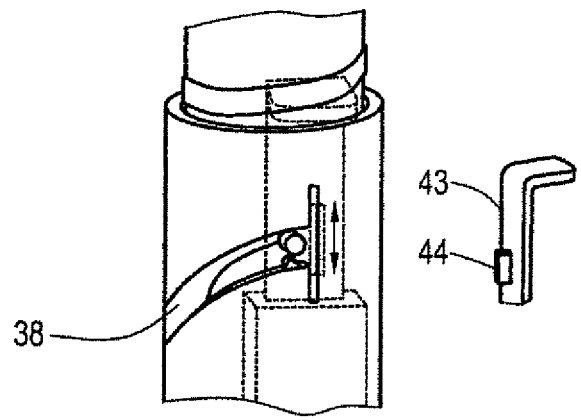
FIG. 15 the transmission emergency release during unlocking by a pin.

When applying a force, the user is able to guide the pin 39 over the detent portion 42, the pin 39 is guided along the guideway 38 under the action of the spring element 41, while the carriage 40 is lowered until reaching again the initial position. The actuating lever 34 rotates hereby also back to the initial position. Unlocking by lifting the pin 39 over the detent portion 42 is shown in FIG. 15. When being pushed upwards, the locking element 43 automatically presses by means of an ejector 44 the pin 39 from the locked end position over the detent portion 42. This ensures that the emergency release is disabled, when the actuating element is removed from the vehicle-fixed mount, and the carriage assumes in its starting position at the bottom.

The invention claimed is:

1. A transmission emergency release for an automatic transmission which is mechanically blocked when a parking mode is engaged, said transmission emergency release comprising a manually operable actuating element for mechanical disabling the parking mode, said actuating element including a mount which is secured to a body of a motor vehicle and provided with a force-transmitting element operatively connected to the automatic transmission, and an actuating lever removably insertable in the mount to disable the parking mode via the force-transmitting element, wherein the force-transmitting element includes a cable pull, further comprising a tie rod received in the mount and connected to a mount-proximal end of the cable pull, said tie rod being configured for releasable connection with the actuating lever when the actuating lever is inserted into the mount, said actuating lever having a handle and a carriage, said carriage being configured for connection with the mount by a form fit and coupled with the handle so as to disable the parking mode via the tie rod.

2. The transmission emergency release of claim 1, wherein the actuating lever is configured for connection with the mount by a formfit.

3. The transmission emergency release of claim 1, wherein the mount has a plate configured for insertion by a matingly formed portion of the actuating lever.

4. The transmission emergency release of claim 1, wherein the actuating lever has a locking element configured for insertion in an opening of the body.

5. The transmission emergency release of claim 4, wherein the opening is configured as a groove or hole.

6. The transmission emergency release of claim 1, wherein the force-transmitting element includes a cable pull, further comprising a tie rod received in the mount and connected to a mount-proximal end of the cable pull, said tie rod being configured for connection with the actuating lever by a form fit and/or interference fit, when the actuating lever is inserted into the mount.

7. The transmission emergency release of claim 1, wherein the actuating lever has a crank which is operatively connected with the force-transmitting element so as to apply an actuation force on the force-transmitting element, when the crank is turned.

8. The transmission emergency release of claim 7, wherein the actuating element has a force multiplication for reducing the actuation force when the crank is turned by hand.

9. A motor vehicle, comprising: an automatic transmission which is mechanically blocked when a parking mode is engaged; and a transmission emergency release having a manually operable actuating element for mechanical disabling the parking mode, said actuating element including a mount which is secured to a body of a motor vehicle and provided with a force-transmitting element operatively connected to the automatic transmission, and an actuating lever removably insertable in the mount to disable the parking mode via the force-transmitting element, wherein the force-transmitting element includes a cable pull, further comprising a tie rod received in the mount and connected to a mount-proximal end of the cable pull, said tie rod being configured for releasable connection with the actuating lever when the actuating lever is inserted into the mount, said actuating lever having a handle and a carriage, said carriage being configured for connection with the mount by a form fit and coupled with the handle so as to disable the parking mode via the tie rod.

10. The motor vehicle of claim 9, wherein the actuating fever is configured for connection with the mount by a formfit.

11. The motor vehicle of claim 9, wherein the mount has a plate configured for insertion by a matingly formed portion of the actuating lever.

12. The motor vehicle of claim 9, wherein the actuating lever has a locking element configured for insertion in an opening of the body.

13. The motor vehicle of claim 12, wherein the opening is configured as a groove or hole.

14. The motor vehicle of claim 9, wherein the force-transmitting element includes a cable pull, further comprising a tie rod received in the mount and connected to a mount-proximal end of the cable pull, said tie rod being configured for connection with the actuating lever by a form fit and/or interference fit, when the actuating lever is inserted into the mount.

15. The motor vehicle of claim 9, wherein the actuating lever has a crank which is operatively connected with the force-transmitting element so as to apply an actuation force on the force-transmitting element, when the crank is turned.

16. The motor vehicle of claim 15, wherein the actuating element has a force multiplication for reducing the actuation force when the crank is turned by hand.

17. A motor vehicle, comprising: an automatic transmission which is mechanically blocked when a parking mode is engaged; and a transmission emergency release having a manually operable actuating element for mechanical disabling the parking mode, said actuating element including a mount which is secured to a body of a motor vehicle and provided with a force-transmitting element operatively connected to the automatic transmission, and an actuating lever insertable in the mount to disable the parking mode via the force-transmitting element, wherein the actuating lever has a locking element configured for insertion in an opening of the body after the actuating lever is removably inserted into a locked position of the mount from a previously stowed position, to formfittingly couple the actuating lever to the mount.

* * * * *